United States Patent [19]

Goto et al.

[11] Patent Number: 4,661,760
[45] Date of Patent: Apr. 28, 1987

[54] CONTROL SYSTEM FOR ENGINE-DRIVEN GENERATOR

[75] Inventors: Hiroshi Goto; Akira Kikuchi; Yoshitaka Hibino, all of Saitama; Atsushi Totsune, Tokyo; Norimitsu Kurihara, Saitama; Takefumi Hosaka, Saitama; Takeshi Kijima, Saitama, all of Japan

[73] Assignee: Honda Giken Kogyo Kabushiki Kaisha, Tokyo, Japan

[21] Appl. No.: 616,262

[22] Filed: May 31, 1984

[30] Foreign Application Priority Data

Jun. 1, 1983 [JP] Japan ................................. 58-97558

[51] Int. Cl.$^4$ .............................................. H02J 7/14
[52] U.S. Cl. ...................................... 322/27; 320/64; 322/28; 322/7
[58] Field of Search ................ 322/7, 8, 25, 27, 28, 322/59; 320/64, 68, 61, 22, 32, 39

[56] References Cited

U.S. PATENT DOCUMENTS

| | | | |
|---|---|---|---|
| 4,290,109 | 9/1981 | Taniguchi et al. | 320/32 |
| 4,308,492 | 12/1981 | Mori et al. | 320/39 X |
| 4,536,697 | 8/1985 | Johnston et al. | 322/59 X |
| 4,543,521 | 9/1985 | Morishita et al. | 322/28 X |

Primary Examiner—R. J. Hickey
Attorney, Agent, or Firm—Lyon & Lyon

[57] ABSTRACT

There is disclosed herein a generator control system for use in a power supply system for vehicles in which a battery and an engine-driven generator are connected in parallel with a load. The total load current fed to the load is detected and the generated voltage level is changed by performing field regulation for the generator in accordance with the detected value. Switching of the generated voltage level of the generator is controlled according to the state of the load applied so as to improve power generation efficiency. Certain parameters, such as battery state, engine speed, auto choke and load state, can be provided as an input or inputs to a voltage regulator for the generator.

17 Claims, 17 Drawing Figures

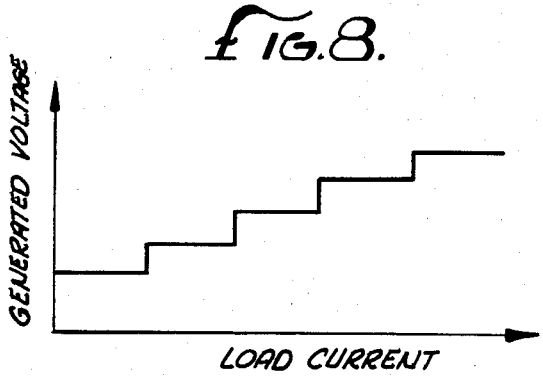
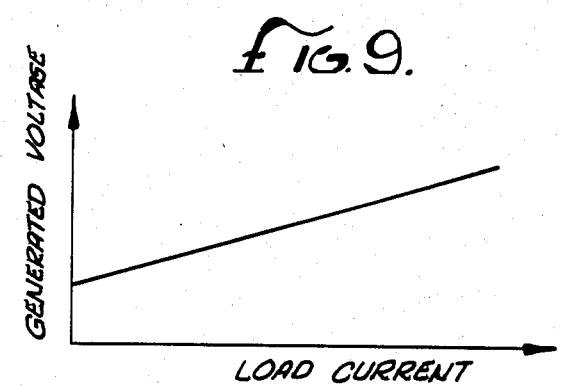
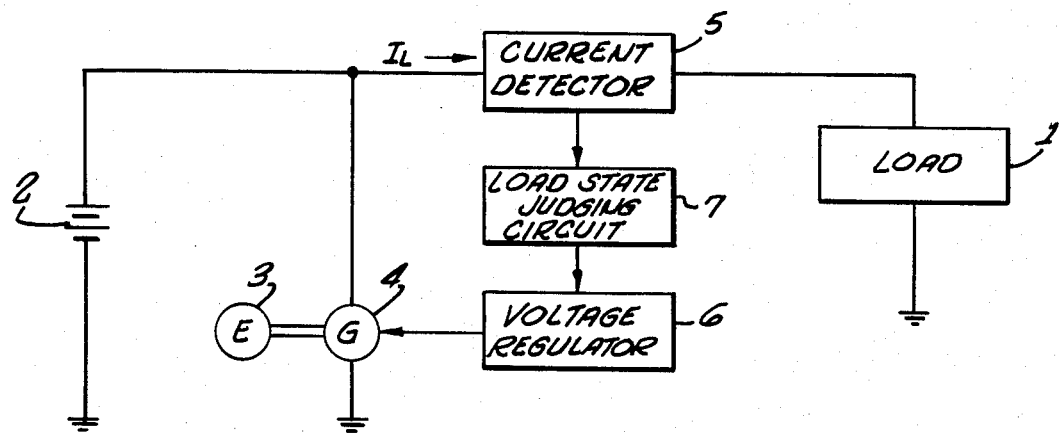
FIG.10.
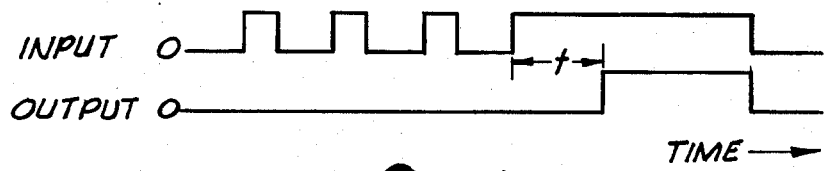
FIG.11.
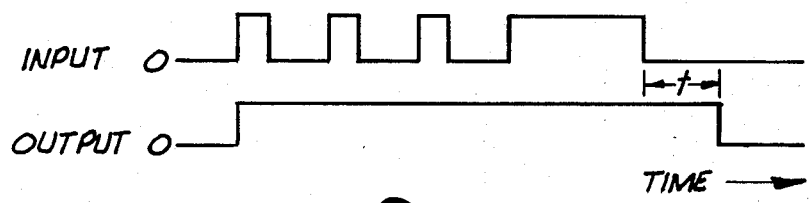
FIG.12.

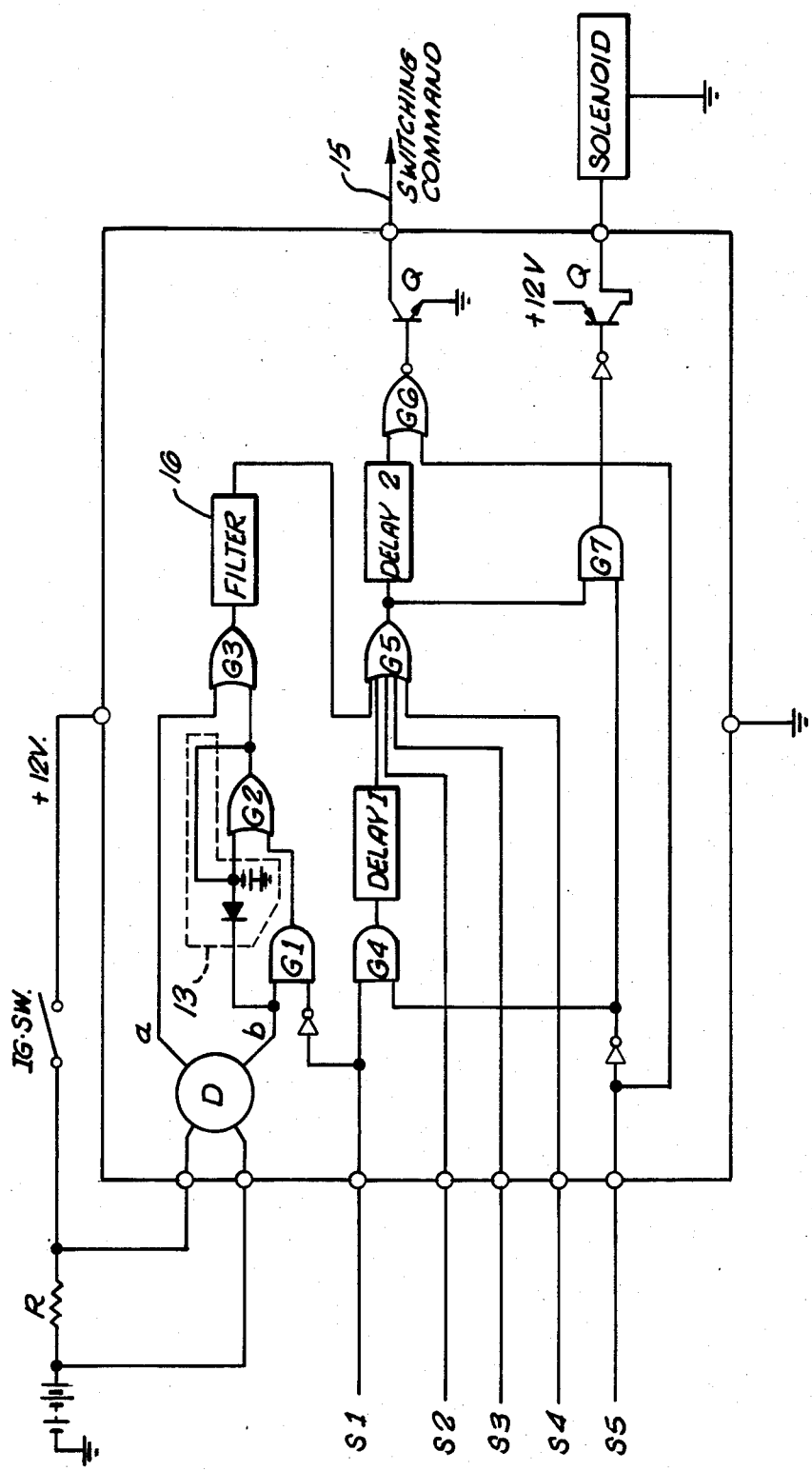

CONTROL SYSTEM FOR ENGINE-DRIVEN GENERATOR

The present invention relates to a control system for controlling the generated voltage of a generator which is driven by an engine.

BACKGROUND OF THE INVENTION

Generally, in generators for vehicles, the generated voltage level is usually set (for example, at 14.5 volts) higher than the full charging voltage of a battery for ensuring a sufficient voltage level for charging the battery and for suitably supplying the electric load. The generated output of a generator for a vehicle varies according to the state of use of the electric loads, and the output of an engine which drives the generator also changes in proportion the use of such loads. But, in the case where the electric load amount is small or the battery is in a fully charged state, it is possible to supply a light load current sufficiently even if the generated voltage of the generator is dropped to the full charging voltage (e.g., 12V) of the battery. By so doing, moreover, not only is it possible to prevent the battery from being overcharged, but also the generator is relieved of its burden of overcharging so that the driving or power loss of the engine can be diminished. Thus, the improvement of the power generation efficiency can be attained.

FIG. 1 shows an output current characteristic of a generator for a vehicle versus the engine speed, taking the generated voltage as a parameter. As the generated voltage increases, the amount of generated power increases and the battery charging rate becomes higher. By utilizing this characteristic, if the power generation is performed at a lower voltage level under a light electric load condition which is an ordinary or usual state, the charging current decreases and the engine load is reduced, thus preventing the battery from being overcharged. On the other hand, under a heavy electric load condition, the generated voltage level is changed to a higher level to increase the amount of generated power, whereby not only the load requirement can be fully satisfied, but also it is possible to prevent overdischarge of the battery.

More particularly, there has heretofore been adopted such a control means as shown in FIG. 2 in which an output current $I_G$ of a generator 4 is detected by a current detector 5, and when the detected value is smaller than a preset level, the excitation of the generator 4 is weakened by a voltage regulator 6 to bring the generated voltage down to the full charging voltage of a battery 2.

However, such a conventional method of controlling the generated voltage according to the output current $I_G$ of the generator 4 is disadvantageous in that the control cannot be done stably because the output current $I_G$ of the generator 4 varies largely, depending on the state of an electric load 1, the speed, i.e., the number of revolutions, of an engine 3, the charging state of the battery 2, and so forth. For example, as shown in FIG. 3, upon starting of the engine, a current of 3 amps or so is supplied in the ignition system, which current is fed by the generator. Thereafter, if a large continuous load such as headlight or air conditioner is added at time point "a", the amount of generated power of the generator increases to make up the deficiency and its output current $I_G$ exceeds a level L set at 6 amps or so, and the generator is switched to a high generation mode (e.g., 14.5 V) (the portion A in FIG. 3). During running, if the engine slows down and its speed approaches an idling state (e.g., 700 rpm) at time point "b", the amount of generated power of the generator decreases and the output current $I_G$ becomes lower than the preset level L, whereby the generator is switched to a lower generation mode (e.g., 12 V) (the portion B in FIG. 3). As the engine speed increases and approaches a cruising state (e.g., 1500 rpm) at time point "c", the generator is again switched to the high generation mode (the portion C in FIG. 3). Thus, even when the electric load condition is constant, the output current $I_G$ of the generator is changed by other conditions such as, for example, the engine speed and the charging state of the battery, and the switching frequency of the preset voltage of the generator is increased by those other conditions, so that the engine output varies at every switching of the preset voltage, thus possibly affecting the power output of the engine.

There has also been proposed a control means as shown in FIG. 4 in which a battery current $I_B$ is detected by a current detector 5, and the generated voltage level of a generator 4 is switched to a high or low level while the detected value is compared with a preset level by a voltage regulator 6. Also in this case there is the problem that even when the applied load is constant, the switching frequency of the preset voltage of the generator 4 is increased by other conditions. For example, as shown in FIG. 5, even if a continuous load is applied at time point "a" when the engine speed is high, there will be no change of a battery charging current $I_{BC}$, but when the engine slows down at time point "b", the battery starts discharging because with only the output current of the generator it becomes no longer possible to supply all the load current. When a discharging current $I_{BD}$ of the battery exceeds a preset level L', the generator is switched to a high generation side (the portion B in FIG. 5). Thereafter, when the engine speed again increases at time point "c", the generator is switched to a low generation side because the output current of the generator increases sufficiently to supply all the load current. The mark "t" in FIG. 5 denotes an amount corresponding to the discharged amount.

It is accordingly an object of the present invention to provide an improved form of control system for an engine-driven generator.

Another object of this invention is to provide a control system for an engine-driven generator having improved power generation efficiency.

It is another object of this invention to provide a control system for an engine-driven generator which is capable of switching the generated voltage level of the generator in a stable manner according only to the state of the load applied.

These and other objects and features of the present invention will become better understood through a consideration of the following description taken in conjunction with the various figures of the drawings.

BRIEF DESCRIPTION OF THE DRAWINGS

FIG. 8 is a characteristic diagram obtained when the generated voltage level is switched in steps according to the magnitude of load current.

FIG. 9 is a characteristic diagram obtained when the generated voltage level is changed continuously according to the magnitude of load current.

FIG. 10 is a block diagram showing another embodiment of the present invention.

FIGS. 11 and 12 are input/output characteristic diagrams showing the contents of processing performed by a load state judging circuit in the embodiment of FIG. 10.

FIG. 17 an electrical block diagram showing an example of a configuration of a control circuit used in the system of FIG. 16.

DETAILED DESCRIPTION

Figure 1:
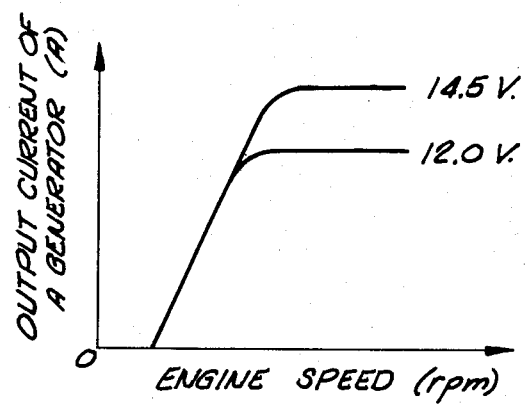
FIG. 1 is a characteristic diagram of the output current of a generator versus engine speed.
Figure 2:
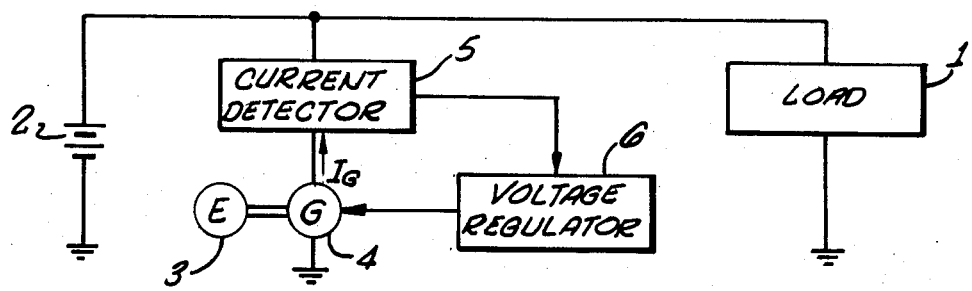
FIG. 2 is a block diagram of a conventional generator control means.
Figure 3:
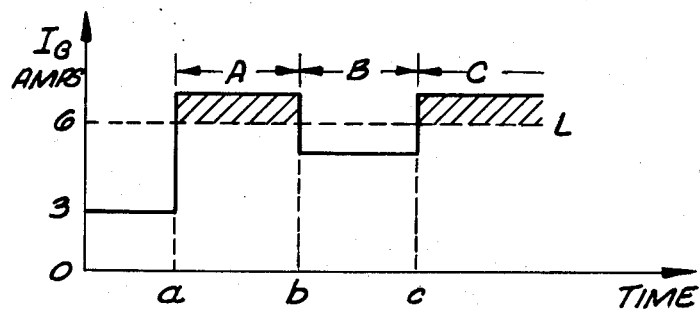
FIG. 3 is a characteristic diagram showing the state of change of the output current of a generator.
Figure 4:
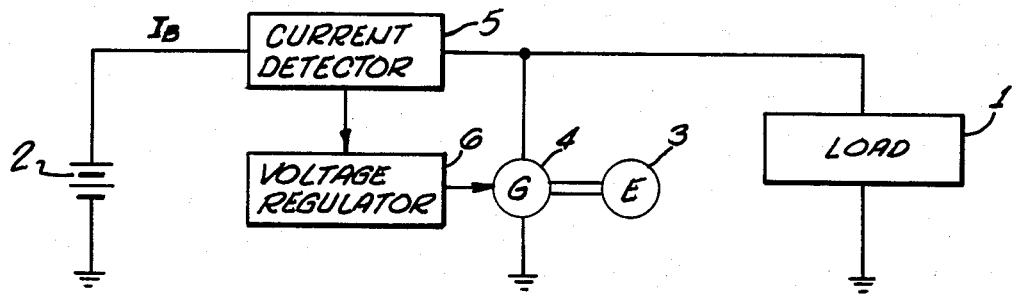
FIG. 4 is a block diagram of another conventional generator control means.
Figure 5:
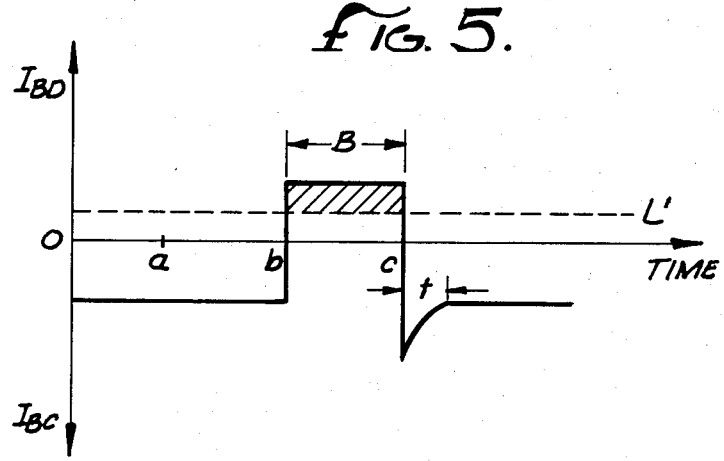
FIG. 5 is a characteristic diagram showing the state of change of a battery current.
Figure 6:
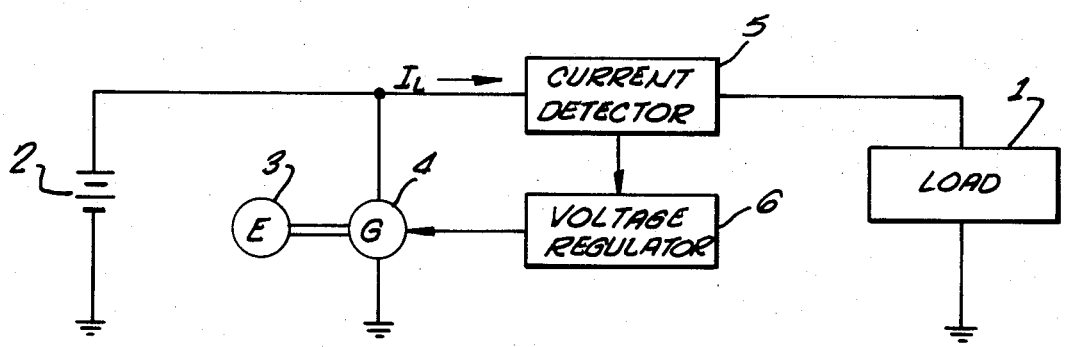
FIG. 6 is a block diagram of an engine-driven generator control system according to an embodiment of the present invention.
Figure 7:
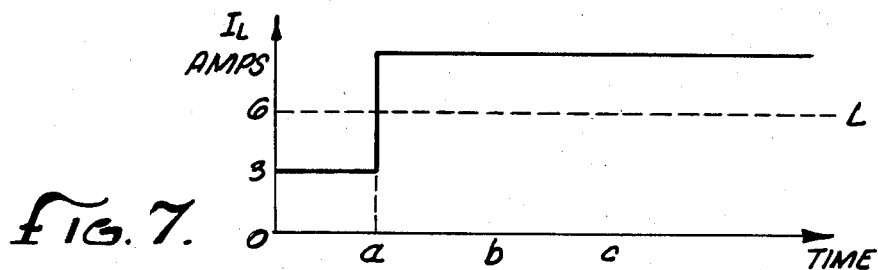
FIG. 7 is a characteristic diagram showing the state of change of a load current.

Embodiments of the present invention will be described in detail below with reference to the accompanying drawings, beginning with the embodiment of FIG. 6. In an engine-driven generator control system according to the present invention, a power source for an electric load 1 comprises a parallel circuit including a battery 2 and a generator 4 driven by an engine 3. The total load current $I_L$ fed to the electric load 1 is detected by a current detector 5, and the state of excitation of the generator 4 is switched by a generated voltage regulator 6 in accordance with the detected total load current $I_L$ to control the generated voltage level In such a control system, if a large continuous load (as indicated in FIG. 7), such as headlights or an air conditioner, is applied, for example, at time point "a" under supply of current of 3 amps or so to the ignition system during rotation of the engine, the load current $I_L$ increases and exceeds a preset level L of 6 amps or so, so that the state of excitation of the generator 4 is switched to a high generation mode by the generated voltage regulator 6. Even if the engine slows down and the output current of the generator 4 is reduced between time points "b" and "c", the load current $I_L$ does not change and is maintained constant because it is supplemented by the battery current. Therefore the switching of the state of excitation of the generator 4 into a low generation mode, which is done by the generated voltage regulator 6 when the load current $I_L$ decreases below the preset level L, does not occur.

Thus, according to the present invention, the switching of the generated voltage level of the generator 4 based on conditions other than the electric load, such as the engine speed and the battery charging state as done heretofore, is no longer performed and, accordingly, the switching frequency is reduced and the chance of causing variation in the engine power output also is reduced.

In the present invention, moreover, when switching the generated voltage level by controlling the state of excitation of the generator through the voltage regulator 6 in accordance with the detected load current $I_L$, the state of excitation of the generator 4 is controlled so as to switch the generated voltage level stepwise or continuously (linearly) according to the magnitude of the load current $I_L$, as respectively shown in FIG. 8 or FIG. 9, whereby the generator 4 can be utilized at an optimum generated voltage level according to the magnitude of the electric load 1, thus permitting more effective power generation efficiency of the generator. More specifically, the state of excitation of the generator 4 is controlled by the generated voltage regulator 6 while comparing the load current $I_L$ detected by the current detector 5 with a multi-stage level preset in a window comparator or by multiplying the load current $I_L$ by a predetermined constant.

Further, when switching the generated voltage level of the geneator 4 according to the load current $I_L$, if an intermittent load such as a windshield wiper or brake lamp is applied, the switching frequency of the generator 4 based on variations of the load current $I_L$ is increased to the extent that the intended stabilization of the generated voltage is no longer attainable. To avoid this inconvenience, in the present invention there can be further provided a load state judging circuit before the voltage regulator 6, as shown in FIG. 10, which judging circuit 7 judges the state of the applied load from variations of the load current $I_L$ and prevents an intermittent switching of the generated voltage level when the applied load is an intermittent load.

More specifically, the load state judging circuit 7 comprises, for example, a filter circuit, which filters the load curent $I_L$ detected by the current detector 5 and provides an output signal when the change of the load current $I_L$ has continued over a predetermined time period t (e.g., 15 seconds) to prevent a response to the load variation within the time period t, as shown in FIG. 11. The load state judging circuit 7 may have a hold circuit which holds the state of change of the load current $I_L$ for a predetermined time period t and provides an output signal, as shown in FIG. 12. Alternatively, there may be used a combination of a timer and an inhibit circuit, in which the inhibit circuit performs an AND operation in an analog fashion to inhibit a response to variations of the load current $I_L$ within a time period t set by a timer.

In the engine-driven generator control system of the present invention, if the generated voltage level of the generator is switched according to a detected state of the battery and that of the engine, in addition to its switching control made in accordance with a detected load current, it becomes possible to effect the optimum control more accurately.

Figure 13:
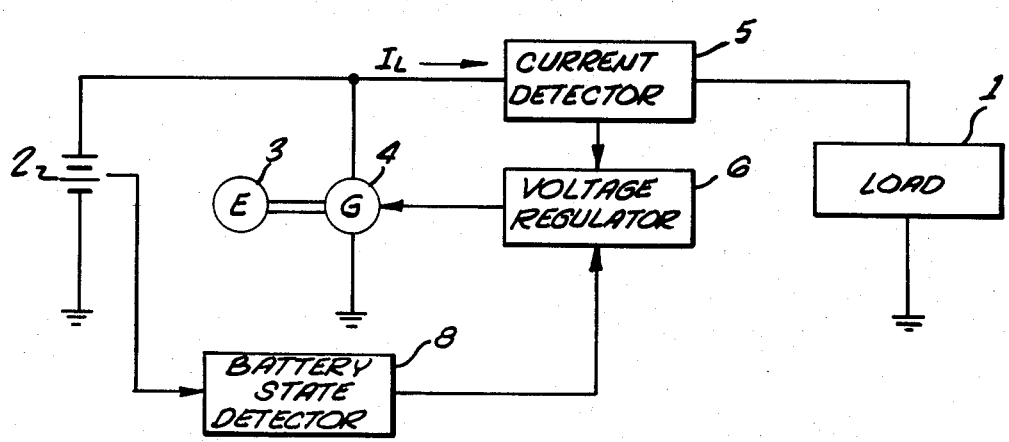
FIGS. 13 through 15 are block diagrams showing still further embodiments of the present invention.

In the embodiment illustrated in FIG. 13, the generated voltage level can be switched according to the state of charge of the battery 2, in which a battery state detector 8 for detecting the charging voltage of the battery 2 is provided, and the function of the generated voltage regulator 6 is extended so that when the detected charging voltage of the battery 2 is lower than a preset reference level, the state of excitation of the generator 4 is forcibly switched to the high generation mode regardless of the magnitude of the load current $I_L$, thereby permitting the battery 2 to be fully charged rapidly. Upon detection of the full charging of the battery 2, the generated voltage regulator 6 ceases the forced switching and thereafter performs the switching control according to the load current $I_L$ to prevent overcharge of the battery 2. When the engine 3 is started in a cold state the consumption of the battery power is increased, and in this case the switching control may be performed in such a manner that the state of charge of the battery 2 is detected indirectly from the temperature of the engine cooling water or the intake air temperature in the engine, in place of the direct detection of the battery charging state, and the generated voltage level is switched forcibly in accordance with the detected temperature.

Further, while the engine rotates at a high speed, the generated torque is large, so the burden of the engine for driving the generator is reduced and the charging current to the battery can now be disregarded as a driving loss of the engine.

Figure 14:
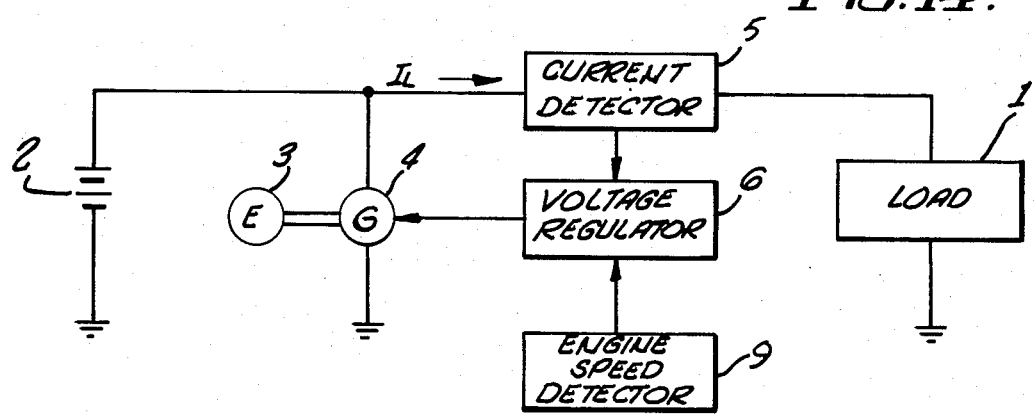

In the present invention, therefore, an engine speed detector 9 for detecting the number of revolutions of the engine 3 is provided, as shown in FIG. 14, and the function of the generated voltage regulator 6 is extended to that when the detected output of the engine speed detecting section 9 exceeds a preset number of revolutions, (e.g., 1500 rpm) at which a sufficient torque is generated in the engine, the state of excitation of the generator 4 is switched forcibly to the high generation mode regardless of the magnitude of the load current $I_L$ at that time, thus allowing the battery 2 to be charged rapidly. Whether the generated torque of the engine 3 is sufficient or not may be detected indirectly according to whether the vehicle speed is above a certain level (e.g., 45 km/hr) or according to whether the change gear is shifted in the position in which the vehicle assumes a cruising state, other than according to the engine speed.

Figure 15:
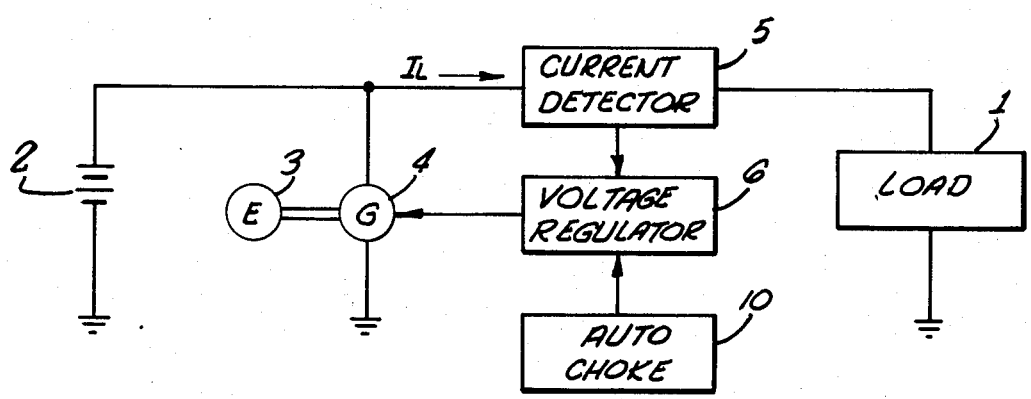

Further, when the engine is started in a cold state, the choke is operated so the engine idle is increased and a sufficient torque is generated, and thus during operation of the choke the engine efficiency is not largely deteriorated even without switching the state of excitation of the generator into the high generation mode. In the present invention, therefore, as shown in FIG. 15, the function of the generated voltage regulator 6 is extended so that, for example, when a choke signal is provided from an auto choke 10, the state of excitation of the generator 4 is switched forcibly to the high generation mode thereby permitting the state of charge of the battery 2 to be recovered rapidly. In place of using the choke signal, the choke operating state may be detected indirectly by detecting that the temperature of the engine cooling water is below a certain level.

Figure 16:
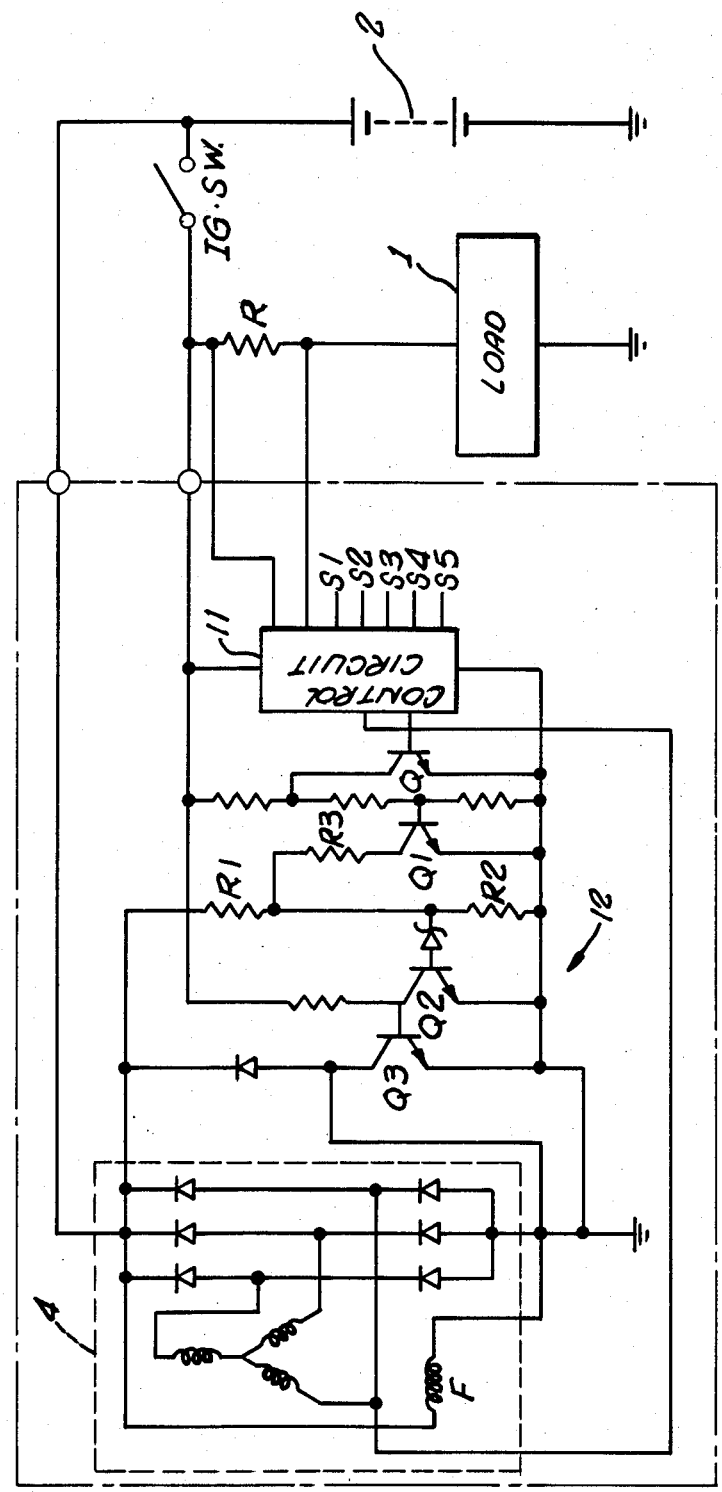
FIG. 16 is a circuit diagram showing a specific example of a circuit configuration in the control system of the present invention.

Referring now to FIG. 16, there is shown an example of a specific circuit configuration in the enginedriven generator control system of the present invention. The illustrated circuit comprises a control circuit 11 which detects a load current fed to the electric load 1 when an ignition switch IG-SW is turned on and which controls the switching of voltage in accordance with that detected signal as well as detected signals indicative of various states of the vehicle provided externally, and a generated voltage switching circuit 12 which regulates the current flowing in a field coil F of an alternating current generator 4 in accordance with an output signal from the control circuit 11 and controls switching of the generated voltage level of the generator 4. The current detector 5 and the generated voltage regulator 6, both shown in FIG. 7, are comprised by the control circuit 11 and the generated voltage switching circuit 12.

The control circuit 11 is configured as shown in FIG. 17. More specifically, the load current level is detected by a current detector D from a potential difference across a shunt resistor R, and this detected output and externally provided signals S1–S5 indicative of various states of the vehicle are subjected to a logical processing to, in turn, drive an output transistor Q, whereby a generated voltage switching command 15 is produced from the control circuit 11. In FIG. 17, the filter 16 denotes a filter which allows a high level ("H") output of a gate G3 to pass therethrough when the "H" output has continued over 3±1 seconds; the delay 1 denotes a timer for delaying the "H" output of a gate G4 by 18±5 seconds; and the delay 2 denotes a timer for delaying the "H" output of a gate G5 by 0.5±0.2 second.

In the circuitry thus described, the output level of the current detector D is preset so that when the load current is between 6 amps and 9 amps, the "a" and "b" outputs of the current detector D become low "L" and high "H" levels, respectively, and when the load curent is above 9 amps, both "a" and "b" outputs become high level "H", and when the load current is in the range of 3 amps (the supply current to the ignition system) to below 6 amps, the load is considered to be low, and both "a" and "b" outputs become low level "L".

When the load current is below 6 amps, both "a" and "b" outputs of the current detector D are "L", and if in this state all of the externally provided signals S1–S5 indicative of various states of the vehicle are "L", the output of the final gate G6 becomes "H" and the output transistor Q is turned on, whereby a command for switching 15 into the low generation side is provided from the control circuit 11 to the generated voltage switching circuit 12. In the switching circuit 12, the base potential of a transistor Q1 approaches the ground potential upon turning on of the output transistor Q, with no current flowing in a resistor R3, so that the potential at the voltage dividing point of a voltage dividing circuit formed by resistors R1 and R2 becomes high and the resistance value of a transistor Q2 becomes smaller, thus permitting an easy flow of current from its collector to its emitter. Consequently, the base potential of a transistor Q3 drops and the current flowing through the field coil F of the generator 4 and the transistor Q3 is reduced, so the field intensity is weakened and the generated voltge level of the generator 4 is switched to 12 V of the low generation mode.

When the load current is above 9 amps both "a" and "b" outputs of the current detector D becomes "H", so that the output of the final gate G6 becomes "L" independently of the level of the vehicular status signals S1–S5 and the output transistor Q is turned off, whereby a command for switching to the high generation mode is provided from the control circuit 11 to the generated voltage switching circuit 12. In the switching circuit 12, the base potential of the transistor Q1 is increased upon turning off of the output transistor Q, thus allowing current to flow also in the circuit of resistor R3. Consequently, since the potential at the voltage dividing point of the voltage dividing circuit formed by the resistor R1 and R2 becomes low, the resistance value of the transistor Q2 becomes large and makes it difficult for current to flow therethrough. As a result, the base potential of the transistor Q3 is raised, allowing the current flowing through the field coil F of the generator 4 and the transistor Q3 to be increased, so the field intensity is strengthened and the generated voltage level of the generator 4 is switched to 14.5 V of the high generation mode.

When the load current is between 6 amps and 9 amps, the "a" and "b" outputs of the current detector D are "L" and "H", respectively, and if in this state the brakes are not in an actuated state and brake signal S1 is "L", the output of a gate G2 becomes "H", so that the output of the final gate G6 becomes "L" and a command for switching to the high generation side is provided from the control circuit 11 to the generated voltage switching circuit 12, whereby switching to the high generation side is effected in the switching circuit 12 in the same manner as described above. In this case, since the brake lamp load current is about 3.7 amps (54 W lamp), the addition thereto of the load current of 3 amps fed to the ignition system results in a total of 6.7 amps and thus exceeds 6 amps, so if the switching to the high generation mode is done whenever the load current is above 6 amps, the switching of the generated voltage level is performed at every depression of the brake pedal, thus causing a frequent change in load of the engine. To avoid this inconvenience, there is provided a control so that only when a load current above 6 amps is detected on the basis of a load other than the brake lamp load, the load is judged to be large and the generated voltage level is switched to the high generation mode. Further, if the brakes are actuated and the brake signal becomes "H" when the load current is a load other than the brake lamp load, the output of a gate G1 changes from "H" to "L", so in order to avoid this inconvenience there is provided a hold circuit 13 for holding the output of the gate G2 at "H" as long as the load current continues to be above 6 amps and the "b" output of the current detector D is "H".

The brake lamp load current is as large as 3.7 amps as noted above and its application interval is not constant, so if the switching to the high generation side is done at every depression of the brake pedal, there occurs a frequent change in load of the engine. In order to avoid this inconvenience, the brake signal S1 is applied to delay 1 only when a deceleration signal S5 is provided from a pressure vacuum switch is "L", which pressure vacuum switch detects a load condition below $-580$ mmHg at the downstream side of the throttle valve of the engine, namely a decelerated state of the vehicle, and produces "H" output. And if the brake signal S1 continues to be "H" over $18\pm5$ seconds, the output of the gate G5 is forcibly rendered "H" to effect switching into the high generation mode. In this case, the brake signal S1 (including operation signals of other intermittent loads) may be applied to the gate G5 independently through delay 1 (which may be a hold circuit or a filter circuit). Further, assuming that at a vehicle speed about 45 km/hr a little increase of the engine load will cause no problem because of a stable rotation of the engine, a vehicle speed signal S2 provided from a vehicle speed switch which detects a vehicle speed about 45 km/hr and produces "H" output is applied to the gate G5, and the switching to the high generation side is done forcibly when the vehicle speed signal S2 becomes "H". Moreover, assuming that at an engine cooling water temperature below 75° C., an increase in load of the generator 4 will cause no problem because the engine is at increased idle by the operation of the choke, a water temperature signal S3 provided from a water temperature switch which detects an engine cooling water temperature below 75° C. and produces "H" output is applied to the gate G5, and the switching to the high generation mode is done forcibly when the vehicle speed signal becomes "H". Further, assuming that when an air conditioner as a large load is turned on an increase in load of the generator 4 will cause no problem because the engine is at increased idle at every turning on of the air conditioner, an air conditioner signal S4 provided from an air conditioner switch which produces an "H" output upon turning on of the air conditioner is applied to the gate G5, and the switching to the high generation mode is performed forcibly when the air conditioner signal S4 becomes "H". Moreover, the engine output may be zero during deceleration, and for an effective utilization of such output, the deceleration signal is applied to the final gate G6 and switching to the high generation mode is performed forcibly. The reference numeral 14 in FIG. 17 denotes a solenoid for increasing the idling speed of the engine. The solenoid 14 is energized when an output transistor Q' is turned on, which transistor is adapted to be turned on or off according to the output of a gate G7, to thereby operate the throttle valve at a constant level so that the engine idle can be increased.

As set forth hereinabove, in the engine-driven generator control system of the present invention used in a power supply system for vehicles in which a battery and an engine-driven generator are connected in parallel with respect to an electric load, the total load current fed to the electric load is detected and the generated voltage level is changed by performing a field regulation for the generator in accordance with the detected value, whereby switching of the generated voltage level of the generator can be controlled stably according to only the state of load applied and thus the power generation efficiency can be improved.

While particular time periods, currents, voltages, temperatures, speeds and the like have been given and discussed, it is to be understood that these are examples and other values or ranges can be used.

While presently preferred embodiments of the present invention have been illustrated and descibed, modifications and variations thereof will be apparent to those skilled in the art given the teachings herein, and it is intended that all such modifications and variations be encompassed within the scope of the appended claims.

What is claimed is:

1. In a power supply system for a vehicle in which a battery and an engine-driven generator are electrically connected in parallel with an electric load, a control system for the engine-driven generator, said control system including first means connected in series with the electric load for directly detecting the total load current fed to the electric load, and second means for switching the generated voltage level of the generator by performing a field regulation for the generator in accordance with the detected output of said first means.

2. An engine-driven generator control system according to claim 1, wherein said second means performs the field regulation for the generator by switching the generated voltage level in a stepwise manner.

3. An engine-driven generator control system according to claim 1, wherein said second means performs the field regulation for the generator by switching the generated voltage level linearly in a stepless manner.

4. An engine-driven generator control system according to claim 1, wherein said second means includes a filter circuit for cancelling variations caused by an intermittent load in the load current detected by said first means.

5. An engine-driven generator control system according to claim 1, wherein said second means includes a hold circuit for holding the load current detected by said first means for a preset time period to smooth variations caused by an intermittent load.

6. An engine-driven generator control system according to claim 1, wherein said second means includes an inhibit circuit for cancelling variations caused by an intermittent load by not responding to a change of load current within a time-period preset by a timer.

7. An engine-driven generator control system according to claim 1, wherein said second means includes means for switching the generated voltage level preferentially to a higher level when a detected charging voltage of the battery is lower than a preset value.

8. An engine-driven generator control system according to claim 1, wherein said second means includes means for switching the generated voltage level preferentially to a higher level when a detected temperature of engine cooling water is lower than a preset value.

9. An engine-driven generator control system according to claim 1, wherein said second means includes means for switching the generated voltage level preferentially to a higher level when a detected intake air temperature in the engine is lower than a preset value.

10. An engine-driven generator control system according to claim 1, wherein said second means includes means for switching the generated voltage level preferably to a higher level when a detected output torque of the engine is higher than a preset value.

11. An engine-driven generator control system according to claim 1, wherein said second means includes means for switching the generated voltage level preferentially to a higher level in accordance with a choke signal.

12. In a power supply system for a vehicle in which a battery and an engine-driven generator are electrically connected in parallel with respect to an electric load, a control system for the engine-driven generator including current detector means connected in series with the load for detecting the total load current fed to the load, and generated voltage regulator means responsive to said current detector means and connected to said generator for switching the generated voltage level by controlling the field regulation of the generator in accordance with the output of said current detector means.

13. An engine-driven generator control system according to claim 1, wherein said current detector means further includes means for judging the state of the load which is responsive to total load current fed to the load and for providing an output signal to said generated voltage regulator means.

14. An engine-driven generator control system according to claim 1, further including a battery state detector for applying a control input to said generated voltage regulator.

15. An engine-driven generator control system according to claim 1, further including engine parameter detector means connected for providing an input to said generated voltage regulator.

16. An engine-driven generator control system according to claim 1, wherein said current detector means includes a shunt resistor for detecting the total load current.

17. A power supply system for a vehicle in which a battery and an engine-driven generator are electrically connected together in parallel and in parallel with an electric load, a control system for the engine-driven generator including first impedance means connected in series with the electric load for directly detecting the total load current fed to the electric load by the battery and generator, and second means for performing field regulation for the generator as a function of the total load current detected by the first means.

* * * * *